Nov. 11, 1952   H. C. WATERS   2,617,852
ELECTRICAL WELL LOGGING SYSTEM
Filed Feb. 10, 1950
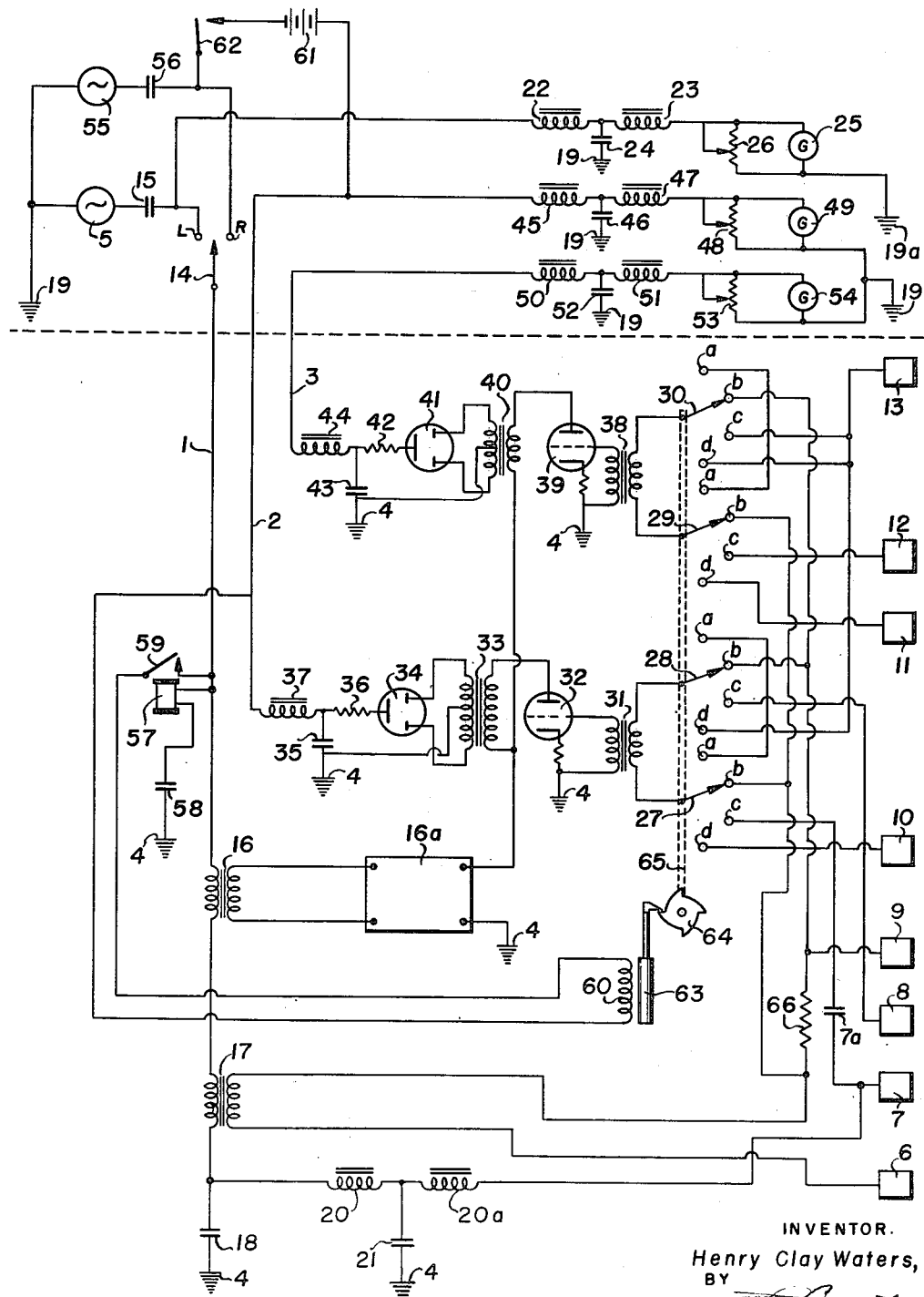
INVENTOR.
Henry Clay Waters,
BY
ATTORNEY.

Patented Nov. 11, 1952

2,617,852

UNITED STATES PATENT OFFICE 2,617,852

ELECTRICAL WELL LOGGING SYSTEM

Henry Clay Waters, Houston, Tex., assignor to Perforating Guns Atlas Corporation, Houston, Tex., a corporation of Delaware Application February 10, 1950, Serial No. 143,449

12 Claims. (Cl. 175—182)

This invention relates to an electrical system for logging oil wells or the like and more particularly to a system especially arranged to employ a three conductor cable in making resistivity and potential curves or logs of wells.

At the present time most electrical logs of oil wells are made with a cable having six conductors. It has long been realized that a cable having so many conductors is disadvantageous in that it is heavy and expensive, subject to short circuiting and not accurate for depth measurements in a well because of stretch. To overcome these disadvantages, it has heretofore been proposed to log wells with a single conductor cable. Single conductor systems have met with commercial success, but while they obviate the disadvantages of a multiple conductor system, they introduce complications in another respect, for they are inherently very complicated electrically and require the exercise of great skill and caution to keep them in working order.

In accordance with the present invention, it is proposed to devise an electrical logging system which might be said to be midway between the two extremes mentioned above. A three conductor cable is employed and the electrical system is so constructed as to be simple and rugged and yet obtain a number of logs or curves while making one round trip with the electrodes in the borehole.

A three conductor cable lends itself well to "laying" and insulating. Moreover, it is very strong and has a minimum of stretch. These facts have long been known in the art but no one heretofore has taken advantage of them in electrical logging systems simultaneously making multiple resistivity and potential curves. The system of the present invention is especially arranged to do so.

In the electrical logging of wells, it is desirable to obtain as many curves as possible giving resistivity values at varying penetrations into the formations traversed by the borehole. It is also desirable to obtain simultaneously with the various resistivity curves, a curve showing variations in natural earth potential. Means is provided, in accordance with the present invention, for making two resistivity curves of different penetration simultaneously with a natural potential curve when the logging tool is moving in one direction in the borehole. Suitable switching means is also provided so that two resistivity curves differing from those first made, may be made simultaneously with a potential curve when the logging tool is moving in the opposite direction.

Accordingly, it is an object of the present invention to provide a new and improved method and apparatus for obtaining indications of the earth resistivity and natural potential of earth formations traversed by a borehole which is characterized by simplicity, flexibility, and accuracy of operation.

A further object of the invention is to provide a method and apparatus of the above character in which indications of variations in electrical resistivity at two different distances of penetration or investigation are transmitted to the surface of the earth in the form of slowly changing direct current values simultaneously with the transmission of the natural D. C. potential of the earth as exists between a moving electrode in the hole and a fixed reference electrode at the surface.

Another object of the invention is to provide a new and improved method and apparatus employing a three conductor electrical circuit extending from the surface of the earth to investigation apparatus in the borehole for simultaneously investigating three different subjects of interest therein in which electrical responses are obtained at the surface which are related to changes in the respective subjects of interest being investigated. For example, three resistivity curves may be made simultaneously or two resistivity curves and a natural potential curve may be made simultaneously.

A further object of the invention is to provide a novel circuit arrangement and apparatus whereby the mutual inductive and capacity coupling between cable conductors, and the insulation leakage from cable conductors to sheath will have practically no effect on the magnitude and character of the transmitted signals.

Still another object is to provide a novel calibrating circuit for an electrical logging system.

Additional objects and advantages of the invention will appear from following detailed descriptions taken in conjunction with the accompanying drawing in which the single figure is a schematic diagram of an electrical system illustrating the principles of the invention.

Referring to the drawing, the reference characters 1, 2, and 3 designate conductors of a three conductor cable having a metallic armor. The armor is not shown in the drawing but it will be understood that it serves as a suitable ground for all equipment in the well bore and the various grounds in the borehole are represented by the character 4. The cable is trained over a sheave (not shown) at the surface of the ground and wound upon a reel (not shown) in the customary manner. One of the conductors of the cable, such as conductor 1, may be provided with means at its upper end for connecting it to a source of 400 cycle alternating current 5, which is used for resistivity logging, as will presently be explained. At its lower end, the cable is provided with a housing containing all the subsurface equipment including eight insulated electrodes designated 6, 7, 8, 9, 10, 11, 12, and 13 which are on the outside of the housing so as to make electrical contact with the formation through the borehole fluid. Thus all of the electrodes are supported on the cable and are lowered into the well bore thereby. All of the subsurface equipment is shown beneath the dashed line on the drawing while the surface equipment is shown above the dashed line.

The 400 cycle source of power 5 is so arranged that it supplies a constant current to equipment in the borehole. One side is grounded at the surface as shown at 19. It is contemplated that two grounds, spaced some distance apart, will be used for the surface equipment, one of which may be an electrode placed in the slush pit of the well. On the drawing this ground is designated 19. The circuit for the source 5 is completed through condenser 15, switch 14 when closed to its left contact, conductor 1, the primaries of transformer 16 and 17, the condenser 18 and back to ground at 4.

The transformer 16, through suitable apparatus 16a, supplies plate voltage for the amplifying vacuum tubes in the borehole and also furnishes a source of filament voltage for the tubes, but the circuits for the filaments are not shown, being well known and forming no part, per se, of the present invention.

The transformer 17, when the 400 cycle source 5 is in circuit constitutes means utilizing one or more current electrodes for creating an alternating current electric field in the formation. As shown the secondary of the transformer 17 is connected to the electrodes 6 and 9 so that 400 cycle alternating current flowing in conductor 1 establishes an alternating current electric field in the formation between electrodes 6 and 9. In the making of the resistivity curves with the arrangement illustrated, both current electrodes 6 and 9 are always used. However, as is well known, resistivity curves can be made with only one current electrode in the borehole and the invention is not limited to the particular electrode configuration illustrated.

At the same time that 400 cycle alternating current is flowing down conductor 1, direct current may flow in it to transmit a natural earth potential signal to the surface of the ground. To this end a measuring circuit 22, 23, 24, 25, 26, is provided at the surface, one side of which is grounded at 19a, while the other side is connected to conductor 1 and the electrode 7 in the borehole is connected to the conductor 1 above the D. C. blocking condenser 18. Direct current flowing from electrode 7 to ground electrode 19a is proportional to the spontaneous earth potential or natural earth potential and is independent of the alternating current field established between electrodes 6 and 9. The condenser 7a confines the natural earth potential to the proper circuit. At the surface this D. C. potential is blocked from the circuit of the source 5 by means of condenser 15.

In the subsurface equipment the alternating current from source 5 is blocked from electrode 7 by means of a filter section consisting of series chokes 20 and 20a, the common terminals of which are grounded through a condenser 21. The natural or spontaneous earth potential is separated from the alternating current at the surface by a filter consisting of the chokes 22 and 23 and the condenser 24. The spontaneous earth potential is recorded directly by means of galvanometer 25 and is calibrated by potentiometer 26.

For making resistivity curves, four electrode systems are illustrated although as indicated above, the invention is not limited to that number or to the configuration shown. The electrodes 6 and 9 are current electrodes. The others are potential or probe electrodes. They determine or measure the alternating current voltages between separate sets of points in the alternating current electric field created by the current flow between electrodes 6 and 9. Ordinarily, two resistivity curves are made at a time, although it is possible to make three if no natural potential curve is made and if additional equipment is provided.

Associated with the electrodes in the borehole are four single pole, multiple throw switches designated 27, 28, 29, and 30. Each has four buttons designated a, b, c, and d and all are actuated in unison. As shown in Fig. 1, the first set of probes consist of electrodes 7 and 8. The A. C. voltage across probe electrodes 7 and 8 passes through switches 27 and 28 when their blades engage buttons c and the system causes a direct current signal responsive to variations in that alternating current voltage to be transmitted to the surface over conductor 2 of the cable at a level sufficiently high to be measured.

Simultaneously, while the switches 27 and 28 are engaging their buttons c to transmit a signal from probe electrodes 7 and 8, switches 29 and 30 are engaging their buttons c so that the system causes a direct current signal responsive to variations in A. C. voltage across probe electrodes 12 and 13 to be transmitted to the surface of the ground through conductor 3 of the cable. These signals are transmitted simultaneously. They are independent from each other and independent from the natural potential signal which may be being transmitted over conductor 1 at the same time.

Each pair of switches has its own system for amplifying, rectifying and transmitting a signal to the conductor of the cable with which it is associated. Thus, the blades of switches 27 and 28 are connected to the primary of a transformer 31, where the voltage is stepped up and fed by the secondary into a voltage and power amplifier 32 of the conventional type. The output circuit of the power amplifier is connected to the primary of a transformer 33, the secondary of which is connected to a full wave rectifier 34 which impresses the signal, now D. C., onto the conductor 2, through a filter system which includes the condenser 35, the load resistor 36 and the choke coil 37.

Likewise, the blades of switches 29 and 30 are connected to a system which includes transformer 38 which supplies an amplifier 39 connected to an output transformer 40, the secondary of which is connected in circuit with a rectifier 41 to impress a D. C. signal onto the conductor 3 through a filter system which includes the load resistor 42, the condenser 43 and the choke coil 44.

At the surface, the signal coming up the conductor 2 is fed to a circuit which includes a filter consisting of a choke 45, a condenser 46 and a choke 47, a potentiometer 48 and a galvanometer 49. Likewise, the signal coming up over the conductor 3 is fed to a circuit which includes a filter consisting of chokes 50 and 51 and a condenser 52, a potentiometer 53 and a galvanometer 54. These measuring circuits, like that for the natural potential signal, are, of course, of the recording type.

Since there is a considerable amount of mutual induction and capacity between conductors in the cable, a certain amount of the alternating current voltage on the conductor 1 will be coupled to conductors 2 and 3 by means of capacity and induction. In order to separate the D. C. signals from the undesirable induced A. C. voltages the filter sections are necessary. The D. C. signals transmitted over conductors 1, 2, and 3 may be calibrated by means of potentiometers 26, 48, and 53.

In order for the system to be successful it is necessary that the three D. C. signals being transmitted up their respective conductors not be modified or altered in any significant manner. There are three cable characteristics which alter the signals appreciably while they are being transmitted to the surface, unless special precautions are taken. The cable characteristics affecting the signals are (1) mutual induction, (2) capacity between conductors, and (3) leakage resistance to ground.

The interaction between the three transmitted signals due to mutual induction will be proportional to the rate of change of D. C. currents with respect to time. According to the present invention, this interaction is held at an unobjectional value by: (1) keeping the relative magnitudes of the three transmitted signals of nearly the same magnitude or as close to unity as possible; (2) introducing a time constant into the current built up in each circuit by means of the input filters 35—36—37; 42—43—44 and 20—21; (3) traversing the formations in the borehole at a speed which is compatible with the signal voltages and with the time constants of the transmission circuits and at the same time preventing an objectionable amount of interference between conductors due to their mutual induction; (4) if necessary, causing the D. C. current transmitted on conductor 2 to be in the opposite direction to that transmitted on conductor 3. This is accomplished by reversing the anode and cathode rectifier connections in the two transmitting systems. Such a procedure will result in D. C. currents flowing in conductors 2 and 3 with reverse magnetizing characteristics. Their maximum combined effect on conductor 1 will be at a minimum under this condition. Such a procedure might be advantageous in formations where the range of signal values from the resistivity measuring probes far exceed the signal range from the spontaneous potential which is transmitted on conductor 1. Using reversed direction D. C. signals on conductors 2 and 3 will also reduce the amount of magnetizing current on the cable winch and associated equipment which is advantageous.

The capacity interaction from one conductor to another is proportional to $(de/dt)$ the rate of change of voltage with respect to time existing on each conductor. The solution to the problem of eliminating the effects of capacity interaction is found in keeping the D. C. or low frequency terminating impedance at an exceedingly low value in the surface equipment. For example, the D. C. resistance or low frequency impedance of conductor 2, plus the combined series resistance of choke 45 and galvanometer 49, is designed not to exceed a relatively low value, say 300 ohms. This low impedance serves to keep the D. C. voltage between conductors and ground at an exceedingly low value, which means that there is very little voltage on the cable available for interaction. The low frequency impedance of the terminating networks is also very small in comparison to the impedance of the coupling capacity between conductors at low frequencies. Consequently, only an infinitesimally small portion of the already small voltage appearing on the cable is coupled from one circuit to another. In order to maintain a low impedance terminating network at the surface, the necessary rectifier load impedance for the resistivity curves is maintained in the subsurface equipment in the form of resistors 36 and 42. If the low frequency terminating impedance at the surface were high and equal in magnitude to the value of the low frequency capacity impedance between conductors, the system would be inoperative, as it would not only increase the magnitude of the D. C. voltages existing on the various conductors, but would also cause approximately 50% of the voltage existing on one conductor to be coupled into the adjacent conductors.

The problem of leakage resistance to ground is also overcome by providing the surface equipment with low impedance values and the subsurface equipment with high impedance values for the slow changing D. C. transmitted signals. Thus, a substantially constant current arrangement may be provided which reduces the effects of cable leakage until they are unobjectionable. For example, in a constant current network, a 30,000 ohm leakage shunt across a 300 ohm resistance will cause a loss in voltage or current of approximately 1%. Under the same conditions a 30,000 ohm leakage across a 30,000 ohm resistance will cause a loss in voltage of 50%. From this example the advantages of a low impedance network are obvious. It is relatively easy to maintain leakage values around 30,000 ohm. However, it is extremely difficult, if not impossible under some conditions, to maintain leakage values in excess of ½ megohm or 1 megohm which would be necessary if customary high impedance terminating circuits were used. In the system shown this result is obtained by setting the resistors 36 and 42 at high values compared with the surface equipment.

In order to make several resistivity curves with electrode arrangements of different configurations and still keep down the number of conductors in the cable, in accordance with the present invention it is proposed to make two logs or curves while the apparatus is being lowered into the well and two while it is coming out, an arrangement being provided for switching from one configuration to another at will. A source of 60 cycle current and a source of direct current are employed in switching over and these are connected in circuit with two of the conductors of the cable, conductors 1 and 2 being used in the circuit shown in the drawing. The condensers 15 and 18 associated with conductor 1, as well as other elements of the circuits, may have such characteristics as to pass 400 cycle current but not 60 cycle current or direct current. While switching over, relay or control circuits may be employed which pass 60 cycle current but not 400 cycle current. Such selective arrangements are known in the art but have never heretofore been employed in the manner herein set forth.

Accordingly, by means of a solenoid step-by-step switch located in the sub-surface housing it is possible to switch the probe electrodes connected to switches 27, 28, 29, and 30. This switching over is accomplished by remote control from the surface. Switch 14 is placed in its right hand position. This connects a 60 cycle source of power 55 to conductor 1 through a D. C. blocking condenser 56. A 60 cycle relay 57 in the borehole is thus energized, being then in circuit through condenser 58. With relay 57 energized, contact 59 is closed and solenoid 60 is connected directly across conductors 1 and 2. With the solenoid 60 connected across conductors 1 and 2, a D. C. switching voltage from a battery 61 is placed across conductors 1 and 2 momentarily by means of switch 62. The switch 62 is then released. Each time this D. C. switching voltage is applied by closing switch 62, the various switches 27, 28, 29, and 30 are advanced one step in synchronism, the solenoid 60 each time actuating an armature 63 to turn a ratchet wheel 64 one quarter turn. The wheel 64 is mechanically connected to the blades of the switches 27, 28, 29, and 30 as diagrammatically illustrated by the dashed lines 65 of the drawing.

The use of direct current for switching is only possible because two conductors are being used and the net magnetizing effect of the D. C. is zero. The system would be inoperative if only one conductor were used for this direct current, because the equipment would become highly magnetized and result in magnetic "noises," and disturbances of a very undesirable nature from a commercial standpoint.

With the switches 27, 28, 29, and 30 in position $a$, the primaries of transformers 31 and 38 are shorted. That is, both resistivity signal channels are shorted. This, of course, means zero signal input and the galvanometers 49 and 54 at the surface can be set at their zero reference line. With the switch in position $b$, a calibration signal which simulates or represents a definite value of formation resistivity is placed on the two resistivity signal channels by means of the voltage drop across a resistor 66. The galvanometers 49 and 54 can then be calibrated as desired by means of potentiometers 48 and 53. In position $c$, the switches are connected to probe electrodes 7, 8, 12, and 13 for determining the electric field set up in the formation, as described above. In position $d$ the switches are connected to alternate sets of probe electrodes for determining effects of the same field with different electrode configuration, electrodes 10 and 13 being one set and connected to switches 27 and 28 and electrodes 11 and 13 being the other set and connected to switches 29 and 30. Of course, other known configurations could be employed.

Thus, it is seen that with one round trip in the hole, two sets of curves may be obtained. By employing an additional system for amplifying and rectifying, three resistivity curves can be made as one set of curves. On the other hand, as illustrated, one set may contain a spontaneous potential curve and two resistivity curves of a given spacing while the second set may contain a spontaneous potential curve and two resistivity curves differing in their penetration characteristics from the first set. In such an arrangement as illustrated, the spontaneous potential curve, being common to both sets of curves, may be used for correlating the two sets of resistivity curves.

It will be apparent that by making suitable changes in the circuits, the signal for the natural earth potential curve may be transmitted to the surface of the ground over either conductor 2 or conductor 3 of the cable while one of the signals for the resistivity curves is being transmitted over conductor 1. Moreover, signals indicative of other subjects of interest, such as temperature, pressure, hole diameter etc. may be transmitted by the system instead of those indicative of natural potential or resistivity. It will be obvious that through the use of a cable having more than three conductors, more signals can be transmitted. Accordingly, the expression, "a cable having three conductors," as used throughout this specification and in the appended claims is not to be taken as a limitation to three conductors only, and is to be understood as embracing systems employing cables having more than three conductors, of which three or more are used in accordance with the principles of this invention.

While only one embodiment of the invention has been shown and described herein, other arrangements may obviously be provided without departing from the spirit of the invention or the scope of the claims.

I claim:

1. Apparatus for electrically logging oil wells or the like comprising, in combination, a cable having three conductors, at least one current electrode supported on said cable to be lowered into a well bore thereby, a source of alternating current at the surface of the ground together with means for connecting it to one of the conductors of said cable whereby alternating current may be transmitted through the cable, means utilizing said current electrode for creating an alternating field in a formation adjacent the well bore, a plurality of probe electrodes also supported on said cable for determining alternating current voltages at various points in the field so created, a system for amplifying and rectifying the voltages impressed upon said probe electrodes and for impressing separately the resultant direct current voltages upon certain conductors of said cable whereby signals responsive to variations in the voltages may be transmitted simultaneously and independently to the surface of the ground and circuits at the surface of the ground for recording the direct current signal voltages.

2. The apparatus defined in claim 1 in combination with a system for transmitting and recording a direct current voltage directly from one of said probe electrodes through the conductor of the cable to which the source of alternating current is connected and in which said circuits at the surface of the ground are of low impedance compared to the capacity impedance between the conductors of said cable, whereby a natural potential log may be obtained simultaneously with the recording of said direct current signal voltages.

3. Apparatus for electrically logging oil wells or the like comprising, in combination, a cable having three conductors, two current electrodes supported on said cable to be lowered into a well bore thereby, a source of alternating current at the surface of the ground, one pole of which is grounded at the surface and the other pole of which is connected to one of the conductors of said cable whereby alternating current may be transmitted through the cable and supplied to said current electrodes thereby creating an alternating field in a formation adjacent said current electrodes, two pairs of probe electrodes also supported on said cable for determining alternating current voltages at two points in the field so created, systems for amplifying and rectifying the voltages existing between the pairs of probe electrodes and for impressing separately the resultant direct current voltages upon the other two conductors of said cable whereby two signals responsive to variations in the voltages may be transmitted simultaneously and independently to the surface of the ground and circuits at the surface of the ground for recording the direct current signal voltages.

4. The apparatus defined in claim 3 in combination with a system for transmitting and recording a direct current voltage directly from one of said probe electrodes through the conductor of the cable to which the source of alternating current is connected and in which said circuits at the surface of the ground are of low impedance compared to the capacity impedance between the conductors of said cable whereby a natural potential log may be obtained simultaneously with the recording of said direct current signal voltages.

5. Apparatus for electrically logging oil wells or the like comprising, in combination, a cable having three conductors, at least one current electrode supported on said cable to be lowered into a well bore thereby, a source of alternating current at the surface of the ground together with means for connecting it to one of the conductors of said cable whereby alternating current may be transmitted through the cable, means utilizing said current electrode for creating an alternating field in a formation adjacent the well bore, a plurality of probe electrodes also supported on said cable for determining alternating current voltages at various points in the field so created, two independent systems for amplifying and rectifying alternating current voltages and separately impressing the resultant direct current signal voltages upon the other two conductors of the cable, a switching system operable by manipulations at the surface of the ground for selectively connecting certain of said probe electrodes to said amplifying and rectifying systems and circuits at the surface of the ground for recording the direct current signal voltages.

6. The apparatus defined in claim 5 in combination with a system for transmitting and recording means a direct current voltage directly from one of said probe electrodes through the conductor of the cable to which the source of alternating current is connected and in which said circuits at the surface of the ground are of low impedance compared to the capacity impedance between the conductors of said cable whereby a natural potential log may be obtained simultaneously with the recording of said direct current signal voltages.

7. The apparatus defined in claim 5 in which said switching system includes an alternating current source at the surface of the ground of a different frequency than said first mentioned source of alternating current together with means by which said second mentioned source of alternating current may be alternately connected at will to the same conductor of said cable which normally is connected to said first mentioned alternating current source, a source of direct current at the surface of the ground together with means by which said direct current source may be connected at will to one of the other conductors of said cable, and a relay and a solenoid located in the borehole and carried by said cable, said relay being operated by said second mentioned alternating current source to connect said solenoid in circuit with the conductor of the cable to which said direct current source may be connected whereby said solenoid may be actuated by said direct current source.

8. Apparatus for electrically logging oil wells or the like comprising, in combination, a cable having three conductors, at least one current electrode supported on said cable to be lowered into a well bore thereby, a source of alternating current at the surface of the ground together with means for connecting it to one of the conductors of said cable whereby alternating current may be transmitted through the cable, means utilizing said current electrode for creating an alternating field in a formation adjacent the well bore, a plurality of probe electrodes also supported on said cable for determining alternating current voltages at various points in the field so created, two independent systems, each connected to certain of said probe electrodes, for amplifying and rectifying the alternating current voltages impressed on the probe electrodes and separately impressing the resultant direct current signal voltages upon the other two conductors of the cable, the polarity of the signal voltages upon said two conductors being opposite, and circuits at the surface of the ground for recording the direct current signal voltages.

9. Apparatus for electrically logging oil wells or the like comprising, in combination, a cable having three conductors, at least one current electrode supported on said cable to be lowered into a well bore thereby, a source of alternating current at the surface of the ground together with means for connecting it to one of the conductors of said cable whereby alternating current may be transmitted through the cable, means utilizing said current electrode for creating an alternating field in a formation adjacent the well bore, a plurality of probe electrodes also supported on said cable for determining alternating current voltages at various points in the field so created, two independent systems for amplifying and rectifying alternating current voltages and separately impressing the resultant direct current signal voltages upon the other two conductors of the cable, a switching system operable by manipulations at the surface of the ground for selectively connecting certain of said probe electrodes to said amplifying and rectifying systems and circuits at the surface of the ground for recording the direct current signal voltages, said switching system including means whereby said amplifying and rectifying systems may be shorted for purposes of calibration of said recording circuits.

10. Apparatus for electrically logging oil wells or the like comprising, in combination, a cable having three conductors, at least one current electrode supported on said cable to be lowered into a well bore thereby, a source of alternating current at the surface of the ground together with means for connecting it to one of the conductors of said cable whereby alternating current may be transmitted through the cable, means utilizing said current electrode for creating an alternating field in a formation adjacent the well bore, a plurality of probe electrodes also supported on said cable for determining alternating current voltages at various points in the field so created, two independent systems for amplifying and rectifying alternating current voltages and separately impressing the resultant direct current signal voltages upon the other two conductors of the cable, a switching system operable by manipulations at the surface of the ground for selectively connecting certain of said probe electrodes to said amplifying and rectifying systems and circuits at the surface of the ground for recording the direct current signal voltages, said switching system including means whereby said amplifying and rectifying systems may be shorted and means whereby known alternating current voltages may be impressed upon the inputs thereof for purposes of calibration of said recording circuits.

11. Apparatus for electrically logging oil wells or the like, comprising, in combination, a cable having three conductors, equipment mounted on said cable to be lowered into the well thereby, a source of alternating current at the surface of the ground together with means for connecting it to one of the conductors of the cable whereby alternating current may be transmitted through the cable to said equipment, a signal system for transmitting direct current voltage from an electrode constituting part of said equipment through a conductor of said cable whereby a natural earth potential log may be obtained and two additional signal systems for transmitting other direct current voltages from said equipment to the surface of the ground over the other two conductors of said cable, each of said additional signal systems having a circuit at the surface of the ground of low impedance compared to the capacity impedance between the conductors of said cable whereby two direct current signals indicative of subjects of interest other than natural earth potential may be recorded simultaneously with the recording of the natural earth potential log.

12. Apparatus for electrically logging oil wells or the like, comprising, in combination, a cable having three conductors, equipment mounted on said cable to be lowered into the well thereby, a source of alternating current at the surface of the ground together with means for connecting it to one of the conductors of said cable whereby alternating current may be transmitted to said equipment, a rectifier for converting part of said alternating current into direct current, three signal systems for separately transmitting direct current voltages over the three conductors of the cable, one of said direct current voltages being created by said rectifier and three circuits at the surface of the ground for recording said signals whereby three subjects of interest in the well bore may be investigated simultaneously.

HENRY CLAY WATERS.

REFERENCES CITED

The following references are of record in the file of this patent:

UNITED STATES PATENTS

| Number | Name | Date |
| --- | --- | --- |
| 2,265,768 | Athy | Dec. 9, 1941 |
| 2,268,137 | Evejen | Dec. 30, 1941 |
| 2,390,409 | Aiken | Dec. 4, 1945 |
| 2,398,761 | Aiken | Apr. 23, 1946 |
| 2,415,364 | Mounce | Feb. 4, 1947 |